(12) United States Patent
Fischer

(10) Patent No.: US 12,509,309 B2
(45) Date of Patent: Dec. 30, 2025

(54) TAPERING OF A CONVEYOR FLOW OF PIECE GOODS

(71) Applicant: Körber Supply Chain Logistics GmbH, Constance (DE)

(72) Inventor: Felix Fischer, Constance (DE)

(73) Assignee: KÖRBER SUPPLY CHAIN LOGISTICS GMBH, Constance (DE)

(*) Notice: Subject to any disclaimer, the term of this patent is extended or adjusted under 35 U.S.C. 154(b) by 119 days.

(21) Appl. No.: 18/565,292

(22) PCT Filed: Sep. 24, 2021

(86) PCT No.: PCT/EP2021/076304
§ 371 (c)(1),
(2) Date: Nov. 29, 2023

(87) PCT Pub. No.: WO2022/253452
PCT Pub. Date: Dec. 8, 2022

(65) Prior Publication Data
US 2024/0300749 A1    Sep. 12, 2024

(30) Foreign Application Priority Data
May 31, 2021 (EP) .................................... 21176912

(51) Int. Cl.
*B65G 47/68* (2006.01)
*B65G 57/32* (2006.01)

(52) U.S. Cl.
CPC ......... *B65G 47/683* (2013.01); *B65G 47/681* (2013.01); *B65G 57/32* (2013.01); *B65G 2047/689* (2013.01)

(58) Field of Classification Search
CPC ............... B65G 47/683; B65G 47/681; B65G 2047/689; B65G 57/32
(Continued)

(56) References Cited

U.S. PATENT DOCUMENTS

| 3,596,747 A | 8/1971 | Irving, Jr. et al. |
| 4,645,061 A * | 2/1987 | Welch ............ B65G 57/32 198/418.4 |

(Continued)

FOREIGN PATENT DOCUMENTS

| EP | 3069836 A1 | 9/2016 |
| EP | 3881842 A1 | 10/2018 |

(Continued)

OTHER PUBLICATIONS

European Patent Office, International Search Report dated Feb. 24, 2022, entire document.

*Primary Examiner* — Mark A Deuble
(74) *Attorney, Agent, or Firm* — Price Heneveld LLP

(57) ABSTRACT

A conveyor line arrangement for tapering a conveyor flow of piece goods includes a first section divided into at least a first partial conveyor flow and a second partial conveyor flow and to generate a height difference between the first partial conveyor flow and the second partial conveyor flow such that the first partial conveyor flow is arranged higher than the second partial conveyor flow at the end of the first section, and a second section is configured to take over piece goods from the first partial conveyor flow and the second partial conveyor flow of the first section, and wherein the conveyor line arrangement is configured to feed the first partial conveyor flow to the second partial conveyor flow by transferring piece goods from the first partial conveyor flow to piece goods of the second partial conveyor flow on the second section.

21 Claims, 5 Drawing Sheets

(58) Field of Classification Search
USPC .......................................... 198/448, 452, 453
See application file for complete search history.

(56) References Cited

U.S. PATENT DOCUMENTS

| | | | | |
|---|---|---|---|---|
| 4,846,336 A | * | 7/1989 | Hoyland | B65G 47/084 198/432 |
| 4,947,624 A | * | 8/1990 | Cones, Sr. | B65B 35/50 53/540 |
| 5,092,448 A | * | 3/1992 | Cinotti | B65G 57/32 53/152 |
| 5,469,687 A | | 11/1995 | Olson | |
| 5,755,075 A | * | 5/1998 | Culpepper | B65B 61/207 53/238 |
| 5,997,238 A | * | 12/1999 | Garrard | B65G 57/32 414/790.7 |
| 7,073,656 B2 | * | 7/2006 | Gust | B65G 47/088 198/452 |
| 7,156,606 B2 | * | 1/2007 | Bridier | B65B 35/44 414/789.6 |
| 7,681,374 B2 | * | 3/2010 | Schulte | B65B 35/58 198/374 |
| 7,909,157 B2 | * | 3/2011 | Giuliani | B65G 57/32 198/418.9 |
| 10,336,556 B2 | * | 7/2019 | Heitplatz | B65G 21/2054 |
| 10,377,570 B2 | * | 8/2019 | Dirkmann | B65G 47/681 |
| 11,718,484 B2 | * | 8/2023 | Stachel | B26D 7/32 198/458 |

FOREIGN PATENT DOCUMENTS

| | | |
|---|---|---|
| EP | 3498639 A1 | 6/2019 |
| GB | 769710 A | 3/1957 |
| JP | H05305927 A | 11/1993 |
| WO | 2007071084 A1 | 6/2007 |

* cited by examiner

TAPERING OF A CONVEYOR FLOW OF PIECE GOODS

BACKGROUND

The invention relates to the technical field of the rejuvenation of conveyor flows of piece goods. The term tapering is understood to mean a reduction in the width of the conveyor flow.

On collector belts and generally when merging several consignment streams, it is often necessary to reduce the conveyor belt width.

At constant belt speed and high current density, this can only be done by stacking the piece goods on top of each other in the conveyor flow.

Previously used devices for tapering piece goods function in a similar way to a snowplow and are therefore sometimes referred to as snowplows in informal technical jargon. In this case, the tapering of the conveyor flow and the generation of height are realized locally at the same point due to the geometry of the snowplow.

A disadvantage of the known solutions is that they can lead to congestion or jamming when the bandwidth is reduced, especially at high transmission current densities.

A disadvantage of such a snowplow is that it does not always generate sufficient height before the conveying width is reduced.

The present invention is therefore based on the task, the tapering of a conveyor flow of unit loads, or, respectively, to prevent the of piece goods, or to reduce the risk of their occurrence.

SUMMARY OF THE INVENTION

According to one aspect, a conveyor section arrangement for tapering a conveyor flow of piece goods is presented. The conveyor line arrangement comprises a first line section and a second line section adjoining the first line section in a conveying direction. The conveyor section arrangement is designed to convey the conveyor flow on the first section divided into at least a first partial conveyor flow and a second partial conveyor flow and to generate a height difference between the first and the second partial conveyor flow, so that at the end of the first section the first partial conveyor flow is arranged higher than the second partial conveyor flow. The second conveyor section is configured to take over piece goods from the first partial conveyor flow of the first conveyor section and the second partial conveyor flow of the first conveyor section and to convey them further. The conveyor section arrangement is designed to feed the first partial conveyor flow to the second partial conveyor flow by transferring piece goods from the first partial conveyor flow to piece goods of the second partial conveyor flow on the second section.

According to one embodiment, the first section is designed to perform a first function of generating height of the first partial conveyor flow with respect to the second partial conveyor flow. This allows to reduce the risk of dust formation when the conveyor flow is tapered.

According to one embodiment, the second section is configured to perform a second function of tapering the conveyor flow.

According to one embodiment, the first and the second section are arranged and configured to perform the first function and the second function locally separately. This reduces the risk of congestion during tapering.

According to one embodiment, the second section is not configured to further increase the height difference between the first partial conveyor flow and the second partial conveyor flow. This allows easy separation of the generation of the height difference from the tapering function.

According to one embodiment, the first section comprises a first conveyor surface for receiving the first partial conveyor flow, wherein the first conveyor surface of the first section does not tapering or does not tapering substantially in the conveying direction, preferably has a substantially constant conveying width. This allows a simple separation of the generation of the height difference from the tapering function.

According to one embodiment, the first section and/or the second section comprises a passive partial conveyor section on which the first partial conveyor flow is conveyable. The conveyor section arrangement is designed to convey piece goods of the first partial conveyor flow, i.e. piece goods on the passive partial conveyor section, by means of positive and/or frictional locking with conveyed piece goods of the second partial conveyor flow. The advantage of this is that, on the one hand, no separate drive is required for the second partial conveyor flow, i.e. for the second partial conveyor section, and, on the other hand, the difference in height between piece goods of the first and second partial conveyor flows is only generated if so many piece goods are also conveyed at the same time that tapering of the entire conveyor flow makes sense.

A passive conveyor section is typically understood to mean a conveyor section with a conveyor surface for receiving and conveying piece goods that is not motor-driven. Examples of passive conveyor sections are sliding plates or freely rotating rollers that are not coupled to a motor and on which piece goods can rest.

According to one embodiment, the first section comprises an active partial conveyor section on which the second partial conveyor flow can be conveyed. According to one embodiment, the second section also comprises an active partial conveyor section on which the second partial conveyor flow can be conveyed. According to an embodiment example, the partial conveyor section of the first and the second section is designed as a single continuous conveyor section, for example as a single continuous conveyor belt.

Alternatively, or in addition to the active partial conveyor section of the first and/or the second line section, the first line section and/or the second line section also the partial conveyor section on which the second partial conveyor flow is conveyable can comprise a conveying mechanism based on the gravity of the piece goods to be conveyed. Based on gravity means that piece goods resting thereon can be conveyed completely or supportively by means of their own gravity.

According to one embodiment, a first conveyor surface, on which the first partial conveyor flow is conveyed, is arranged at an angle to a second conveyor surface, on which the second partial conveyor flow is conveyed, in a direction transverse to the conveying direction. This allows the second partial conveyor flow to be compressed so that piece goods of the first partial conveyor flow are discharged with increased probability onto piece goods of the first partial conveyor flow on the second section.

According to one embodiment, the conveyor section arrangement comprises a third section, which is arranged upstream of the first section in the conveying direction and which is designed to feed the conveyor flow to the first section.

According to one embodiment, the third section is designed to convey the conveyor flow on a supporting surface that is at least substantially continuous transverse to the conveying direction. The requirement for continuity permits kinks, which, according to an embodiment example, is even desirable in the form of the angled first conveyor surface, but excludes steps over which the piece goods could fall over a greater height and therefore be damaged.

According to one embodiment, the third section is designed to convey the conveyor flow already divided into the first partial conveyor flow and the second partial conveyor flow.

According to one embodiment, the horizontal movement components of the first and second partial conveyor flows run parallel to each other on the first section. This allows piece goods of the second partial conveyor flow to efficiently move piece goods of the first partial conveyor flow by positive and/or non-positive engagement in the conveying direction until said piece goods of the first partial conveyor flow are above said piece goods of the second partial conveyor flow and/or until said piece goods of the first partial conveyor flow reach the second section.

According to an embodiment example, the horizontal movement components of the first and the second partial conveyor flow run parallel and preferably directly next to each other on the third section.

According to an embodiment example, the first partial conveyor flow runs in a lateral region of the conveyor flow.

According to one embodiment, the conveyor section arrangement comprises a vertical or sufficiently steep side wall bordering the conveyor flow to the side of the first partial conveyor flow to prevent piece goods from falling off the conveyor section arrangement laterally.

According to an embodiment, the conveyor section arrangement is designed to generate the height difference by conveying piece goods of the first partial conveyor flow in an ascending manner on the first section and by conveying piece goods of the second partial conveyor flow in a horizontal and/or descending and/or less ascending manner than the first partial conveyor flow.

According to one embodiment, the conveyor section arrangement is designed to generate the height difference by conveying piece goods of the second partial conveyor flow in a descending manner on the first section and by conveying piece goods of the first partial conveyor flow horizontally or in a less steeply descending manner than the second partial conveyor flow.

According to one embodiment, the first and/or the second section is designed as a spiral chute. This makes it possible to reduce the space requirement and the number of individual elements of the conveyor section arrangement.

According to one aspect, a method for tapering a conveyor flow of piece goods is presented. In the method, the conveyor flow is divided into at least a first partial conveyor flow and a second partial conveyor flow. The first partial conveyor flow is raised relative to the second partial conveyor flow by conveying the first and second partial conveyor flows on different partial conveyor sections. The first partial conveyor flow is fed to the second partial conveyor flow by delivering piece goods from the first partial conveyor flow to piece goods of the second partial conveyor flow.

According to one embodiment, piece goods are laterally discharged from the first partial conveyor flow onto piece goods of the second partial conveyor flow.

According to an embodiment example, the first partial conveyor flow is conveyed on a first conveyor surface and the second partial conveyor flow is conveyed on a second conveyor surface. The first conveyor surface is arranged at an angle to the second conveyor surface in a direction transverse to the conveying direction.

According to one embodiment, the lifting of the first partial conveyor flow relative to the second partial conveyor flow is carried out locally separately from the feeding of the first partial conveyor flow to the second partial conveyor flow.

According to one embodiment, process step b) is carried out on a first section and process step c) is carried out on a second section, which is different from the first section and adjoins the first section in the conveying direction. On the second section, the first partial conveyor flow is not raised relative to the second partial conveyor flow. This allows a simple separation of the generation of the height difference from the tapering function.

According to one embodiment, the method step b) is performed on a first section of the line comprising a first conveyor surface for receiving the first partial conveyor flow. The first conveyor surface of the first section does not taper or does not taper substantially in the conveying direction. Preferably, the first conveyor surface of the first section has a substantially constant conveyor width. This allows easy separation of the generation of the height difference from the tapering function.

The first partial conveyor flow can be raised relative to the second partial conveyor flow in a variety of ways by conveying the first and second partial conveyor flows on differently configured partial conveyor sections.

According to one embodiment, the first partial conveyor flow is raised relative to the second partial conveyor flow by the first partial conveyor flow conveying piece goods on the first section of the track in an ascending manner (relative to the earth's gravitational field), while the second partial conveyor flow on the first section of the track is horizontal and/or descending and/or ascending less than the first partial conveyor flow.

According to a further embodiment, the first partial conveyor flow is raised relative to the second partial conveyor flow in that the first partial conveyor flow conveys piece goods horizontally (in relation to the earth's gravitational field) on the first section, while the second partial conveyor flow descends on the first section.

According to a further embodiment, the first partial conveying stream is raised relative to the second partial conveying stream in that the first partial conveying stream conveys piece goods on the first section in a descending manner (relative to the earth's gravitational field), while the second partial conveying stream descends more strongly on the first section than the first partial conveying stream.

According to an embodiment example, piece goods of the second partial conveying stream are conveyed on the first and/or the second section on an actively driven conveying path, for example by means of a driven conveyor belt.

According to an embodiment example, piece goods of the first partial conveyor flow are conveyed on the first and/or the second section on a conveying surface that is not actively driven, for example on a sliding plate or on passive rollers. In this case, unit loads of the first partial conveying stream are preferably conveyed by actively moved unit loads of the second partial conveying stream by means of positive and/or frictional locking in the conveying direction.

According to one embodiment, the first partial conveying stream (10) is raised relative to the second partial conveying stream (20) by conveying the first and second partial conveying streams on a spiral chute that is designed to raise the first partial conveying stream (10) relative to the second partial conveying stream (20).

According to an embodiment example, in contrast to the first section, the third section is not configured to convey the first partial conveying stream in an ascending manner relative to the second partial conveying stream. According to an embodiment example, on the entire third section, the first and the second partial conveying streams are still a coherent or substantially coherent conveying stream.

According to an embodiment example, on the first section and/or on the second section and/or on the third section, the first partial conveying stream is conveyed on a first conveying surface and the second partial conveying stream is conveyed on a second conveying surface. According to an embodiment example, for the first section and/or the second section and/or the third section, the first conveying surface is angled in transverse direction to the conveying direction with respect to the second conveying surface.

According to an embodiment example, the horizontal movement components of the first and the second partial conveying streams run parallel to each other on the first section.

According to one embodiment, the horizontal movement components of the first and second partial conveying streams run parallel to each other on the third section.

According to an embodiment example, the first partial conveying flow runs in a lateral region of the conveying flow and the first partial conveying flow and the conveying flow have a common lateral boundary.

According to one embodiment, the method is carried out on a conveyor line arrangement according to one embodiment of the invention.

According to a further aspect, a conveyor line arrangement is presented which is arranged to perform one of the methods described above.

BRIEF DESCRIPTION OF THE DRAWINGS

In the following, the invention will be described and explained in more detail with reference to the embodiments shown in the figures. Thereby show.

DETAILED DESCRIPTION

Figure 1:
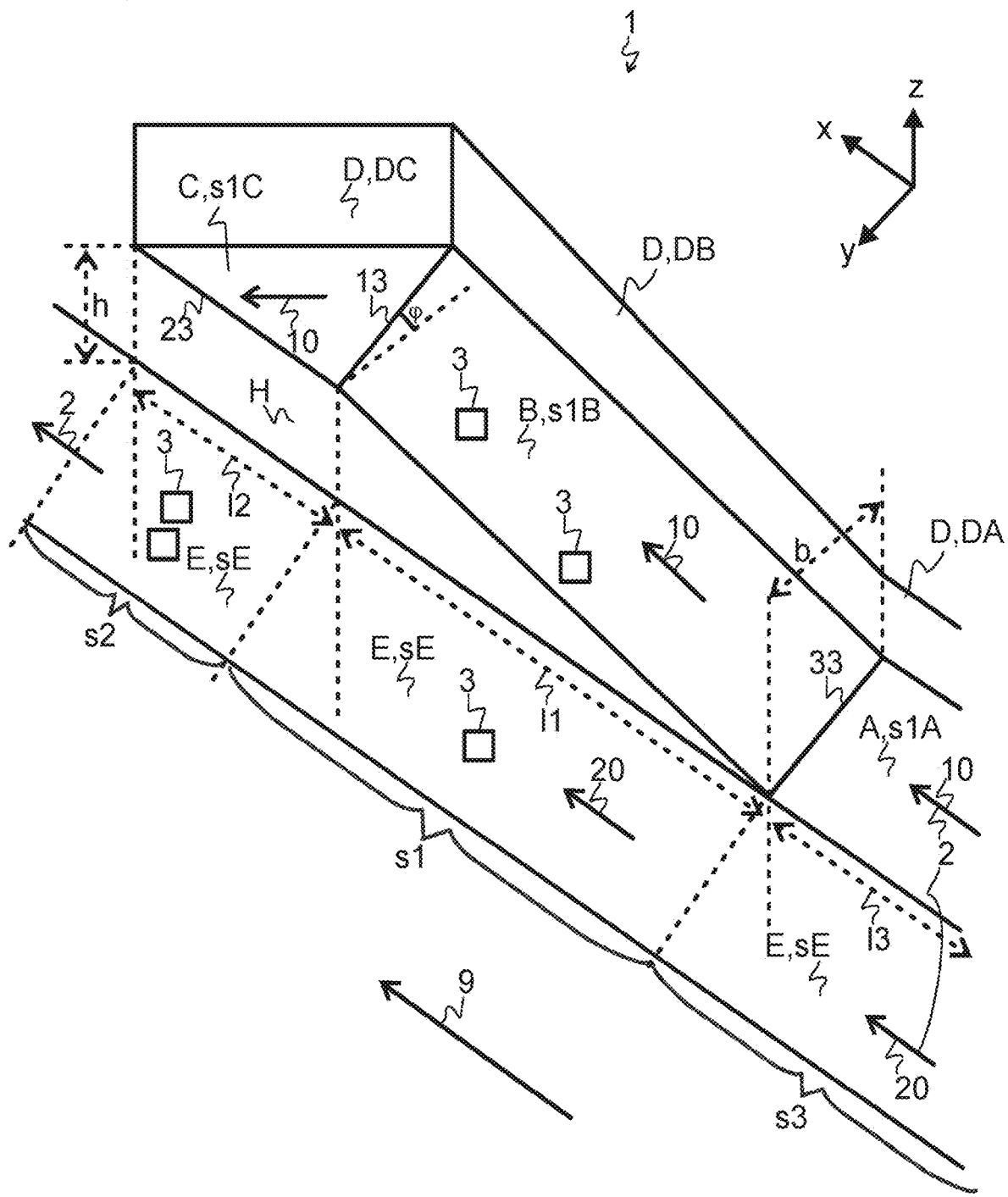
FIG. 1 is a schematic representation in a perspective view of a conveyor line arrangement according to an embodiment example of the invention.

FIG. 1 shows a schematic representation in a perspective view of a conveyor line arrangement 1 according to an embodiment of the invention. The three-dimensional space in which the conveyor line arrangement 1 is located is defined by the coordinate system x, y, z. The coordinate system is selected in such a way that it is possible to see the conveyor line arrangement 1 from a distance. The coordinate system is selected so that the direction z corresponds to the vertical, i.e. the direction of fall in the gravitational field of the earth. The direction x of the coordinate system is chosen to correspond to the projection of a main conveying direction 9 of the conveyor line arrangement onto a horizontal plane. The direction y corresponds to a transverse direction to the projection of the main conveying direction 9 onto a horizontal plane.

The conveyor section arrangement 1 comprises a first section s1 and a second section s2 adjoining the first section s1 in a conveying direction 9, as well as a third section s3 arranged upstream of the first section s1. The line sections s1, s2, s3 are designed to convey piece goods 3 longitudinally divided into a first partial conveying stream 10 and a second partial conveying stream 20 and for this purpose comprise one or more first partial conveying sections s1A, s1B, s1C and one or more second partial conveying sections sE.

In the embodiment example of FIG. 1, the second partial conveyor section sE comprises one or more actively driven conveyor belts, which comprise one or more conveyor surfaces sE, on which piece goods 3 of a second partial conveyor flow 20 are conveyed. Alternatively, instead of conveyor belts, the second partial conveyor section 20 may comprise active roller conveyors or other conveyor sections. Also, different types of conveyor sections, for example conveyor belts, roller conveyors and other conveyor section types may be combined in a conveyor section arrangement to form the second partial conveyor section sE.

In variants, the first partial conveyor sections s1A, s1B, s1C can also be designed as active conveyor sections or combinations of active and passive conveyor sections. In the embodiment example of FIG. 1, however, the first partial conveyor sections s1A, s1B, s1C are designed as passive conveyor sections, for example as sliding plates, or as passive roller conveyors, which comprise first conveyor surfaces A, B, C, on which piece goods 3 conveyed by the first partial conveyor flow 10 rest and can be conveyed, as will be described further below.

In the embodiment example of FIG. 1, the second conveying surface E is arranged horizontally, but in variants it can be inclined in both the x- and y-directions.

The conveying surface A, also called input surface A, has a gradient, i.e. an inclination only in the y-direction towards the first conveying surface E, the angle of inclination $\phi$ to the xy-plane being approximately 25°. The width b of the first partial conveyor section 10 corresponds to the difference in width to be achieved between the conveyor elements upstream and downstream of the snowplow and the conveyor section arrangement 1, respectively. For example, the width b can be 570 mm.

The conveying surface B, also called functional surface B, is used to lift the first conveying stream 10 and has a gradient in x-direction and in y-direction. The angle of inclination in the y direction is identical to that of the input surface A ($\phi$=approximately 25°).

The length l1 and the height h determine the gradient of the functional surface B in x-direction. For example, l1=1500 mm and h=600 mm. The height h to be generated depends on the transmission spectrum.

The conveying surface C, also called functional surface C, serves to taper the conveying stream 2 and has a gradient only in the y-direction with an angle $\phi$ identical to that of the input surface A ($\phi$=approximately 25°). The functional surface C has a triangular shape for tapering the conveying stream 2, where the side of the triangle whose vertical projection is adjacent to the second partial conveying section sE can have a length l2=1000 mm. The taper angle results from l2 and b.

The first partial conveyor sections s1A, s1B, s1C are limited by a 20 vertical side wall D to prevent piece goods 3 from falling off the conveyor section arrangement 1 on the wrong side. The height of the sidewall D depends on the expected or permitted spectrum of consignments.

In the region of the first s1 and the second s2 section, there is a vertical partition H between the two partial conveying streams 10, 20 (respectively between their conveying surfaces B and E, and C and E), which is preferably designed as a metal sheet, and which represents a step between the two partial conveying streams 10 and 20.

In the area of the conveying surface A, the side wall D may have several recesses through which several input send streams (not shown) are fed, which unite on the third section s3 to form the conveyed stream 2. Due to the inclination angle ϕ, piece goods slide from the input send streams onto the second partial conveying section sE. If the coefficient of friction of a unit load on the conveying surface A is too high, or if the second partial conveyor section sE is already occupied by unit loads, however, unit loads remain for the time being on the first partial conveyor section s1A, but are pushed or conveyed on the partial conveyor section s1A by unit loads which are actively conveyed on the partial conveyor section sE by means of frictional and/or positive engagement in the x-direction on the partial conveyor section s1B, likewise by means of frictional and/or positive engagement in the x-direction, and are conveyed from there further onto the partial conveyor section s1C, from where they are discharged laterally onto unit loads 3 of the second partial conveyor stream 20.

The first section s1 is thus designed to convey the first partial conveying stream 10 in an ascending manner relative to the second partial conveying stream 20, so that at the end 13 of the first section s1 the first partial conveying stream 10 is arranged higher than the second partial conveying stream 20.

The second section s2 is designed to take over and further convey piece goods 3 from the first 10 and the second partial conveyor stream 20 of the first section s1 and to feed the first partial conveyor stream 10 to the second partial conveyor stream 20 by laterally dropping piece goods 3 from the first partial conveyor stream 10 onto piece goods 3 of the second partial conveyor stream 20. In this way, piece goods 3 of the second partial conveyor flow 20 can be poured and/or layered and/or stacked on piece goods 3 of the first partial conveyor flow 10.

The conveyor section arrangement 1 is thus designed to convey the conveyor stream 2 on the first section s1 divided into at least a first partial conveyor stream 10 and a second partial conveyor stream 20 and, in the process, to generate a height difference between the first partial conveyor stream 10 and the second partial conveyor stream 20, so that, at the end 13 of the first section s1, the first partial conveyor stream 10 is arranged higher than the second partial conveyor stream 20.

In addition, the second section s2 is designed to take over piece goods 3 from the first partial conveyor flow 10 and the second partial conveyor flow 20 of the first section s1. In addition, the conveyor line arrangement 1 is designed to feed the first partial conveyor flow 10 to the second partial conveyor flow 20 by transferring piece goods 3 from the first partial conveyor flow 10 to piece goods 3 of the second partial conveyor flow 20 on the second line section s2.

The first section s1 is designed to effect a first function of generating height of the first partial conveyor flow 10 relative to the second partial conveyor flow 20. The second section s2 is adapted to perform a second function of tapering the conveyor flow 2, wherein the first s1 and the second section s2 are arranged and adapted to perform the first function and the second function separately.

The conveyor sections s1A and s1B constitute a snow-plow configured to reduce the potential of jamming or congestion of the conveyor flow by locally separating the function of generating height of the first partial conveyor flow 10 from the function of tapering.

Due to the separation of the functions (even with high consignment flow densities), the critical consignments, which are e.g. at the edge, are raised by following the geometry of the optimised snowplow (function area B). Only when sufficient height has been generated does tapering take place (functional area C). In this way, items can be stacked on top of each other and form a three-dimensional stream of items.

In the example shown in FIG. 1, the first partial conveyor flow 10 not only rises relative to the second partial conveyor flow 20 on the section s1, but also relative to the earth's gravitational field. The second partial conveyor flow 20 runs horizontally at least on the first section s1, although it could also run in a descending or less ascending manner than the first partial conveyor flow 10.

Figure 2:
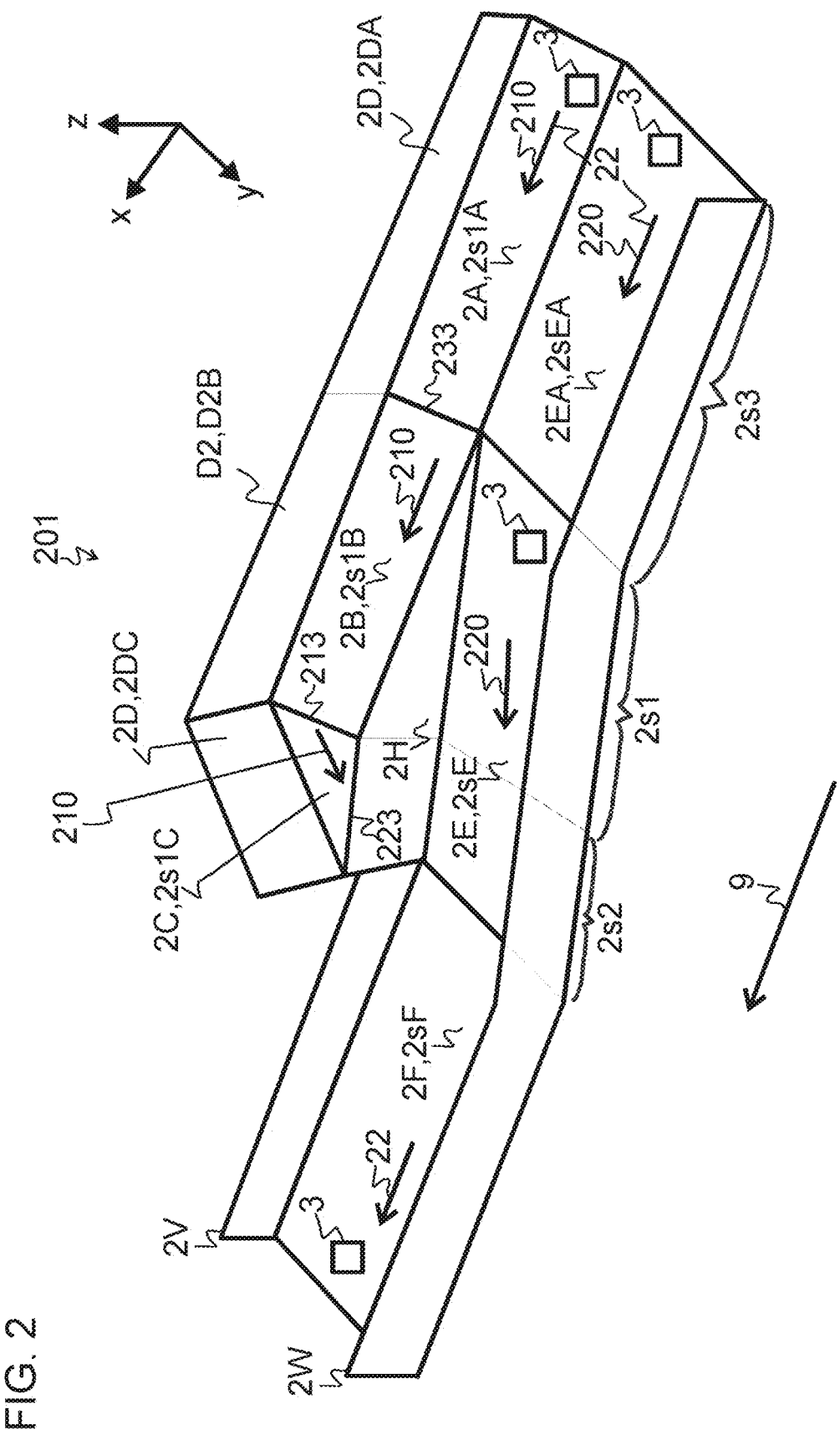
FIG. 2 is a schematic representation in a perspective view of a conveyor line arrangement according to a further embodiment of the invention.

FIG. 2 shows an example of a conveyor line arrangement 201 according to one embodiment of the invention, which differs from the embodiment of FIG. 1 in that the first line section 2s1 is designed to convey the first partial conveyor flow 210 in an ascending manner relative to the second partial conveyor flow 220, in that the first partial conveyor flow 210 runs horizontally relative to the earth's gravitational field, while the second partial conveyor flow 220 runs in a descending manner relative to the earth's gravitational field. The other properties and features of the conveyor arrangement 201 may be the same or substantially the same as those of the embodiment example of FIG. 1. Features comparable, analogous or similar in function to FIG. 1 are generally identifiable in FIG. 2 by analogous reference signs, where in FIG. 2 the respective reference sign is preceded by a 2 (for example, first section 2s1 instead of s1).

Such integration of a snowplow with a negative conveying gradient of the second conveyor surface 2E on the first track section 2s1 can have the advantage over the embodiment example of FIG. 1 that no potential energy has to be built up for the conveyor track arrangement 201 to convey the first partial conveyor flow 210 in order to generate the difference in height between the first partial conveyor flow 210 and the second partial conveyor flow 220. As a result, less energy needs to be expended to convey piece goods 3 of the first partial conveyor flow 210 by means of positive and/or non-positive engagement with piece goods 3 of the second partial conveyor flow 220. This results in an increased probability that a frictional connection between piece goods 3 of the first 210 and the second partial conveyor flow 220 is already sufficient to convey piece goods 3 of the first partial conveyor flow 210, while a positive connection is less frequently necessary. Consignments 3 can thus already slide on the conveyor surface 2B by frictional connection with actively and/or gravity-driven piece goods 3 of the second partial conveyor flow 220.

Figure 4:
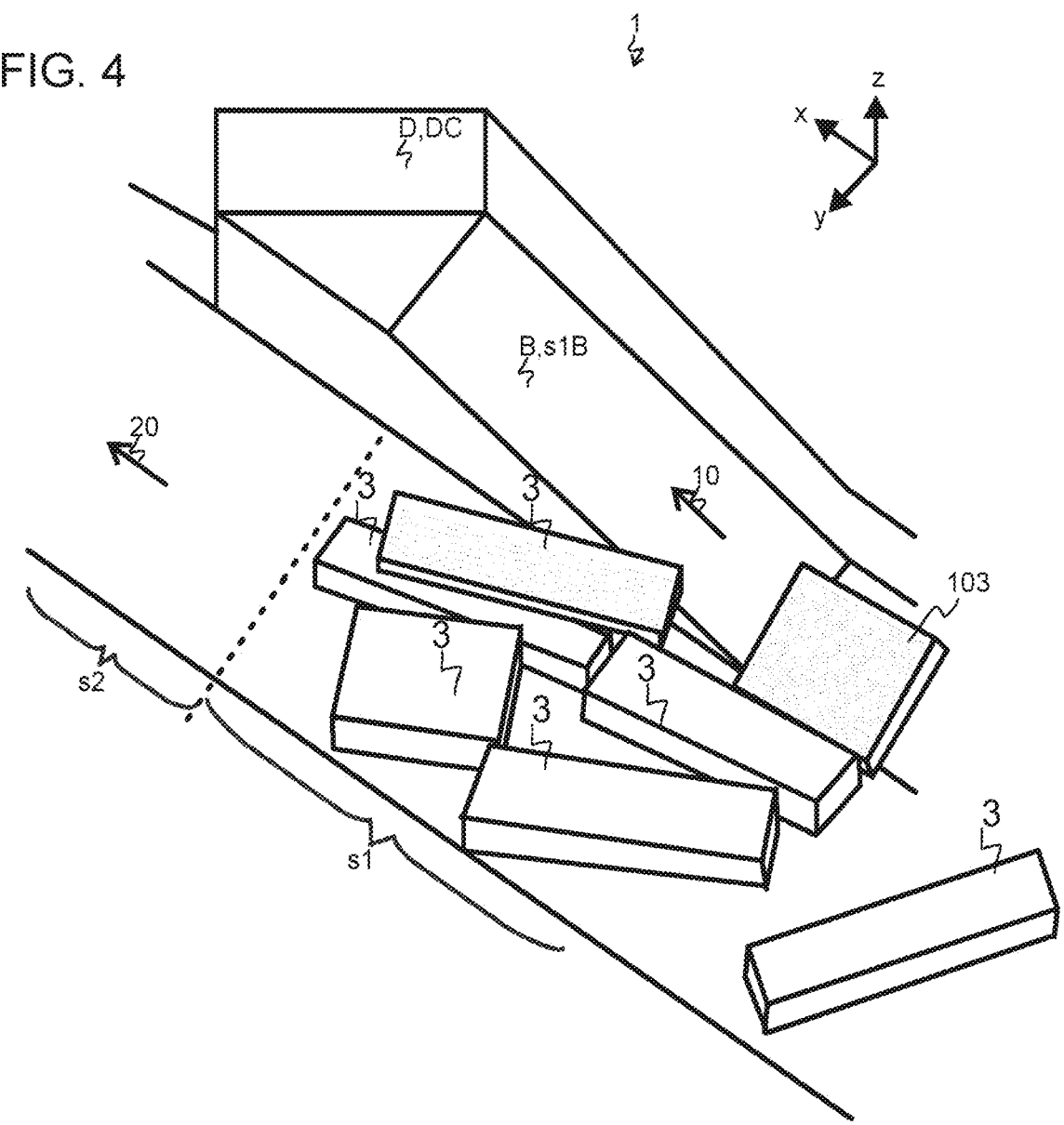
FIG. 4 is a perspective view of the conveyor arrangement of the embodiment of FIG. 1.
Figure 5:
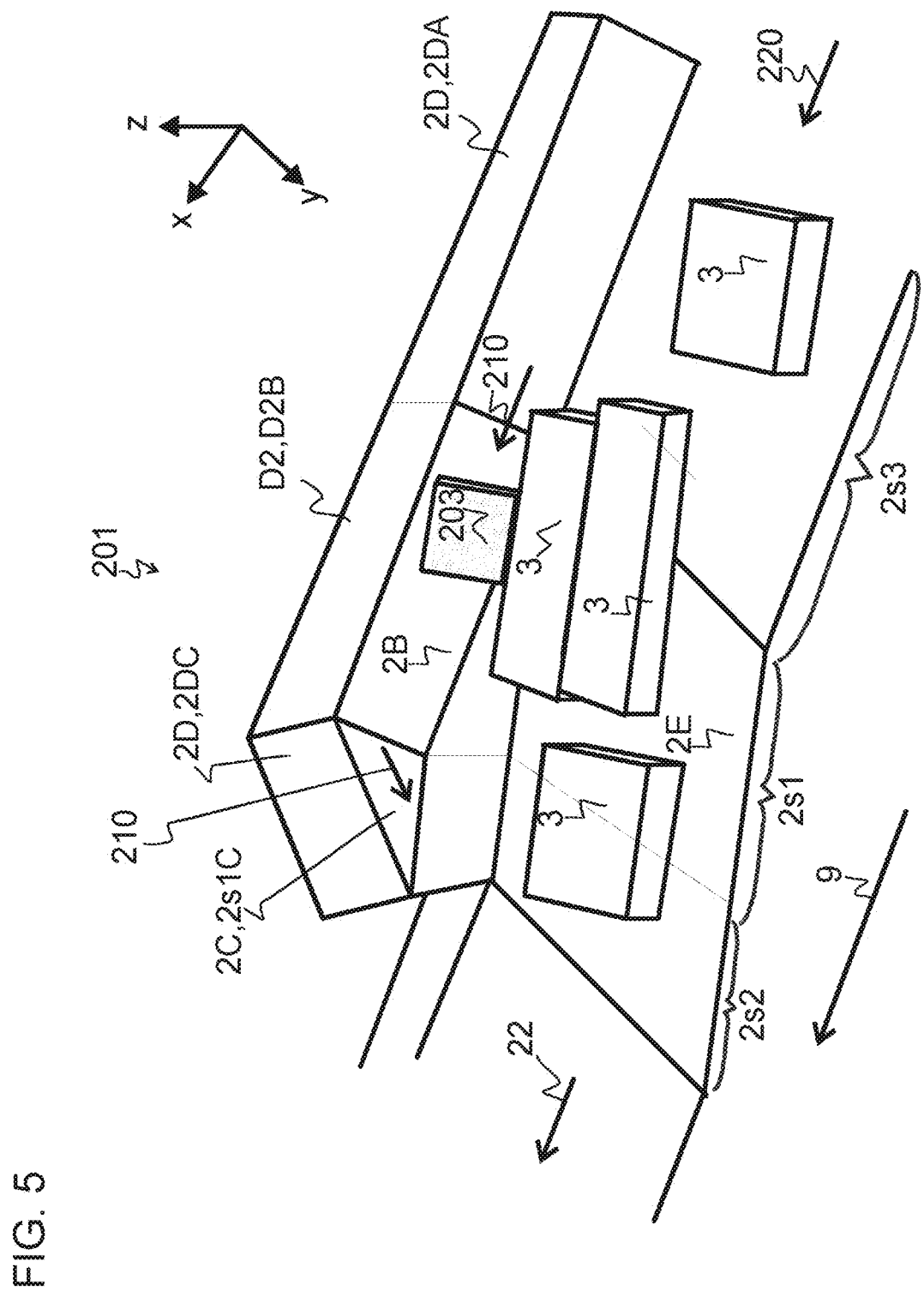
FIG. 5 is a perspective view of the conveyor arrangement of the embodiment of FIG. 2.

FIG. 4 shows a situation in which a conveyor flow is tapered by means of a conveyor section arrangement 1 according to the embodiment example of FIG. 1, while FIG. 5 shows a situation in which a conveyor flow is tapered by means of a conveyor section arrangement 201 according to the embodiment example of FIG. 2. FIG. 4 shows how a piece good 103 of the first partial conveyor flow gets stuck on the conveyor surface B on the section B when the conveyor belt of the conveyor section sE is occupied, as in this case a positive fit with piece goods 3 of the second partial conveyor flow 20 would be necessary to convey this piece good 103 on the rising conveyor surface B. Of course, for other piece goods, depending on their nature, a frictional connection may also be sufficient to convey them up the conveyor surface B.

FIG. 5 shows that the friction (frictional connection) between items 203 lying parallel on the conveyor section 2E and the conveyor surface 2B can be sufficient to convey the item 203 lying on the conveyor surface 2B over the conveyor surface 2B, which has no incline in the conveying direction 9.

An advantage of the embodiment example shown in FIG. 2 is therefore that local, high densities occur less frequently and that the side wall DC designed as a vertical plate is reached less frequently by conveyed piece goods. Since the second section 2s2 represents a critical point for the formation of jams due to its function of reducing the cross-section, the risk of jamming of piece goods 3 on the second section 2s2 is reduced in this way by embodiments according to FIG. 2.

In addition, the partial conveyor surface C can be made larger and merge into the side wall of the subsequent conveyor 2sF.

Simulative tests were carried out for the design example of FIG. 2 on the first section s1 with an angle of attack of the conveyor surface sE (in the conveyor direction) of −14.6°, while the gradient in the conveyor direction (x-direction) for the conveyor surface B is zero.

The partial conveyor sections 2EA, 2E, 2F are furthermore laterally limited by further vertical side walls 2V, 2W where appropriate, in order to prevent piece goods 3 from falling off the conveyor section arrangement 201. Such vertical side walls can of course also be implemented in all other embodiments such as those of FIG. 1 and FIG. 3 described below.

Figure 3:
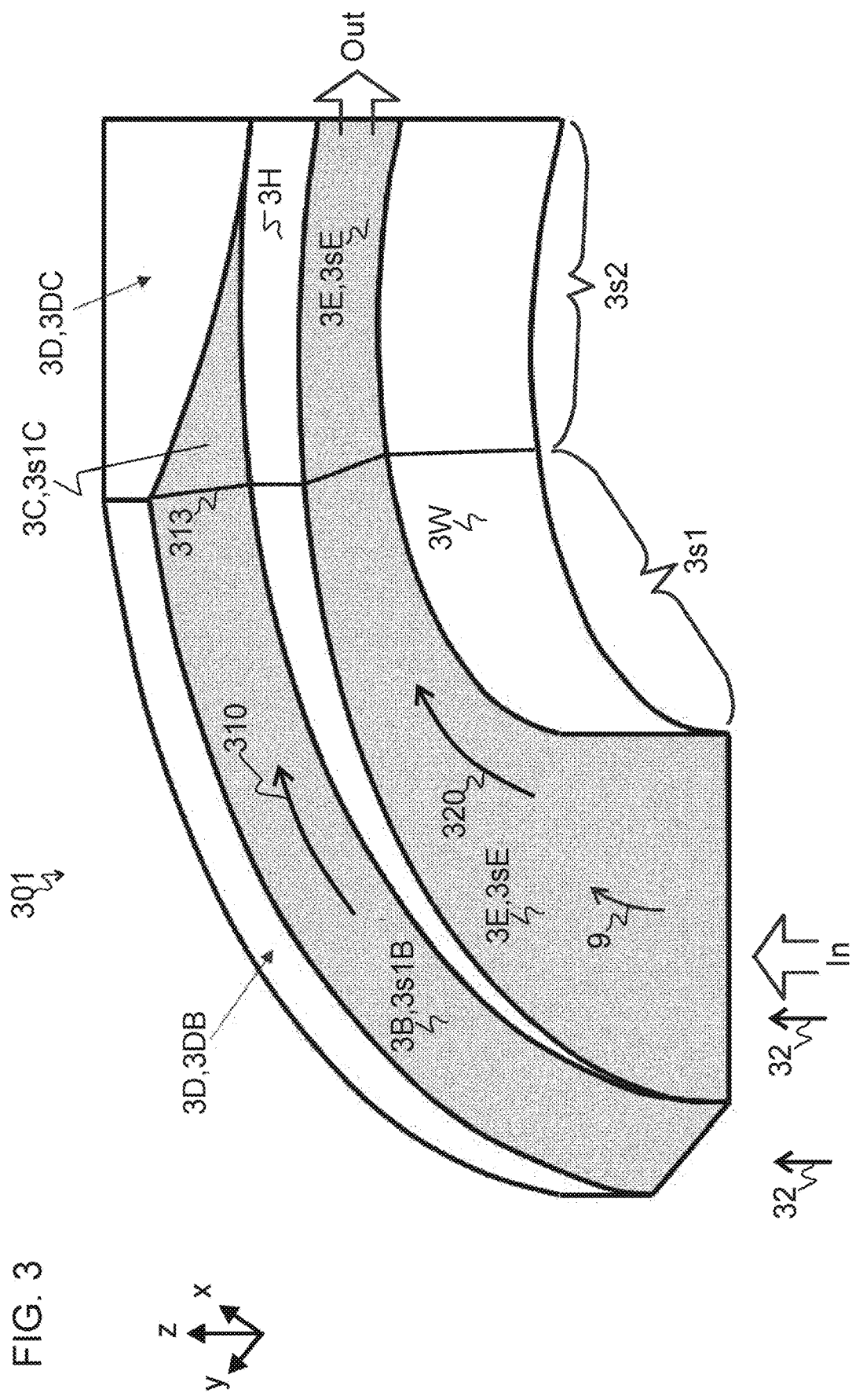
FIG. 3 is a schematic representation in a perspective view of a conveyor line arrangement according to a further embodiment of the invention.

FIG. 3 shows a schematic representation in a perspective view of a conveyor line arrangement 301 according to a further embodiment of the invention. In the conveyor section arrangement 301, the functions of the conveyor section arrangement 201 are integrated into the geometric design of a spiral chute. Here, on the one hand, the advantages of using the snowplow on a slope become effective, and on the other hand, the space requirement as well as the number of individual elements is reduced. The previous alternative consists of a spiral slide and the use of a conventional snowplow upstream or downstream of this slide.

In the embodiment of the conveyor line arrangement 301 shown in FIG. 3, features that are comparable in their functionality to those of FIGS. 1 and/or 2 can again be identified with analogous reference signs, whereby in FIG. 3 the respective reference sign is preceded by a 3 (for example, first line section 3s1 instead of s1 or 2s1).

The conveyor section arrangement 301 comprises a first partial conveyor section 3s1B, 3s1C extending in a conveyor direction 9 along a helix or a segment of a circle and having a first conveyor surface 3B, 3C, and a second partial conveyor section 3sE extending within this helix or this segment of a circle and descending helically in the earth's gravitational field and preferably arranged coaxially to the first partial conveyor section and having a second conveyor surface 3E. The first conveyor surfaces 3B, 3C are also inclined in a radial direction, so that along a radial direction outwards the conveyor surfaces 3B, 3C increase in height. A vertically arranged outer side wall 3D, as well as a vertically arranged inner side wall 3W prevent piece goods 3 from falling sideways out of the conveyor section arrangement 301. Between the outer partial conveyor sections 3s1B, 3s1C and the inner partial conveyor section 3sE runs a vertical wall H which increases in height in the conveying direction 9 and at the same time represents a step between the two partial conveyor sections 3s1B and 3sE.

The conveyor section arrangement 301 and the two partial conveyor sections 3s1B and 3sE are divided along a sectional plane running parallel to the axis of the helix (not shown) into a first section 3s1 and a second section 3s2 adjoining the first section 3s1 in a conveying direction 9. The conveyor section arrangement 1 is designed to convey a conveyor flow 32 on the first section 3s1 at an inlet In divided into at least a first partial conveyor flow 310 and a second partial conveyor flow 320 and, in the process, to generate a height difference between the first partial conveyor flow 310 and the second partial conveyor flow 320, so that at the end 313 of the first section 3s1 the first partial conveyor flow 310 is arranged higher than the second partial conveyor flow 320. The second section 3s2 is designed to take over piece goods 3 from the first partial conveyor flow 310 and the second partial conveyor flow 320 of the first section 3s1, and the conveyor section arrangement 301 is designed to feed the first partial conveyor flow 310 to the second partial conveyor flow 320 by transferring piece goods 3 from the first partial conveyor flow 310 to piece goods 3 of the second partial conveyor flow 320 on the second section 3s2. The conveyor section arrangement 301 is designed to output the thus tapering conveyor flow 32 on the second partial conveyor section 3sE via an output Out.

In order to transfer piece goods 3 from the first partial conveyor flow 310 to the second partial conveyor flow 320, the first partial conveyor flow 3s1C is designed to taper in the conveying direction 9 towards the second partial conveyor flow on the second section 3s2.

The first partial conveyor sections 3s1B, 3s1C are preferably designed as a single sliding surface, whereby the manufacturing effort can be reduced. the second partial conveyor section is also designed as a sliding plate, but can alternatively also be designed as an active driven conveyor section. The conveyor flow 32 is tapered by the conveyor section arrangement 301 analogously to the mode of operation of the conveyor section arrangement 201 described with reference to FIG. 2 by generating a height difference between the two partial conveyor flows 310 and 320 and subsequent tapering separately therefrom on the second section 3s2.

The side wall 3D can be made in one piece and comprise both part walls 3DB and 3Dc and, when the snowplow functionality is integrated into the chute 301, can be made as a flat surface without additional twisting around the helix axis, and then be mounted along the outer boundary of the first part conveyor section 3s1B and 3s1C.

Reference Sign List 1, 201, 301 Conveyor line arrangement
2 conveyor flow
3 piece good
s1 first section
s2 second section
s3 third section
s1A, s1B, s1C, sE, 2sEA, 3sF conveyor line, partial conveyor line
10 first partial conveyor flow
20 second partial conveyor flow
13 end of the first section of the first partial conveyor flow 23 end of the second section of the first partial conveyor flow
33 end of the third section
A, B, C first conveyor surface
D, DA, DB, DC side wall
E, 2EA, 2F second conveyor surface
9 conveying direction
x, y, z coordinates

The invention claimed is:

1. A conveyor line arrangement for tapering a conveyor flow of piece goods, comprising:
a first section and a second section adjoining the first section in a conveyor direction;
wherein the conveyor line arrangement is configured to convey the conveyor flow on the first section divided into at least a first partial conveyor flow and a second partial conveyor flow and to generate a difference in height between the first partial conveyor flow and the second partial conveyor flow such that the first partial conveyor flow is arranged higher than the second partial conveyor flow at the end of the first section;
wherein the second section is configured to take over piece goods from the first partial conveyor flow and the second partial conveyor flow of the first section, and the conveyor line arrangement is configured to feed the first partial conveyor flow to the second partial conveyor flow by transferring piece goods from the first partial conveyor flow to piece goods of the second partial conveyor flow on the second section;
wherein the first section and/or the second section comprises a passive partial conveyor section on which the first partial conveyor flow can be conveyed, the conveyor line arrangement configured to convey piece goods of the first partial conveyor flow via a positive and/or frictional locking with conveyed piece goods of the second partial conveyor flow;
wherein a first conveyor surface on which the first partial conveyor flow is conveyed is arranged at an angle in the transverse direction to the conveyor direction to a second conveyor surface on which the second partial conveyor flow is conveyed; and
wherein the first section and/or the second section comprises an active and/or a gravity-based partial conveyor section on which the second partial conveyor flow can be conveyed.

2. The conveyor line arrangement according to claim 1, wherein the first section is arranged to effect a first function of generating height of the first partial conveyor flow relative to the second partial conveyor flow, and the second section is arranged to effect a second function of tapering the conveyor flow, and wherein the first and second line sections are arranged and configured to perform the first function and the second function separately.

3. The conveyor line arrangement according to claim 1, wherein the second section is not configured to further increase the height difference between the first partial conveyor flow and the second partial conveyor flow.

4. The conveyor line arrangement according to claim 1, wherein the first section comprises a first conveyor surface for receiving the first partial conveyor flow, wherein the first conveyor surface of the first line section has a substantially constant conveyor width.

5. The conveyor line arrangement according to claim 1, further comprising:
a third section arranged upstream of the first section and configured to convey the conveyor flow on a supporting surface extending at least substantially continuously transversely to the conveyor direction.

6. The conveyor line arrangement according to claim 1, wherein horizontal movement components of the first and the second partial conveyor flow run parallel to one another on the first section.

7. The conveyor line arrangement according to claim 1, wherein the first partial conveyor flow is in a side region of the conveyor flow.

8. The conveyor line arrangement according to claim 1, further comprising:
a side wall vertically or sufficiently steeply arranged adjacent to the side of the first partial conveyor flow and limiting the conveyor flow to prevent piece goods from falling laterally from the conveyor line arrangement.

9. The conveyor line arrangement according to claim 1, wherein the conveyor line arrangement is configured to convey piece goods of the first partial conveyor flow in an ascending manner on the first section and to convey piece goods of the second partial conveyor flow in a horizontal and/or descending and/or less ascending manner than the first partial conveyor flow.

10. The conveyor line arrangement according to claim 1, wherein the conveyor line arrangement is configured to convey piece goods of the second partial conveyor flow in a descending manner on the first section and to convey piece goods of the first partial conveyor flow horizontally or to a lesser degree in a descending manner than the second partial conveyor flow.

11. The conveyor line arrangement according to claim 1, wherein the first and/or the second section comprises a spiral chute.

12. A method for tapering a conveyor flow of piece goods, comprising the steps:
a) dividing the conveyor flow into at least a first partial conveyor flow and a second partial conveyor flow;
b) raising the first partial conveyor flow relative to the second partial conveyor flow by conveying the first and second partial conveyor flows on different partial conveyor paths; and
c) feeding the first partial conveyor flow to the second partial conveyor flow by transferring piece goods from the first partial conveyor flow to piece goods of the second partial conveyor flow;
wherein at least during process step b) piece goods of the first partial conveyor flow are conveyed by form-fit and/or force-fit with conveyed piece goods of the second partial conveyor flow, wherein a first conveyor surface, on which the first partial conveyor flow is conveyed, is angled in transverse direction to the conveyor direction to a second conveyor surface, on which the second partial conveyor flow is conveyed, and wherein at least during process step b) piece goods of the second partial conveyor flow are conveyed by resting on an actively driven conveyor section and/or via gravity of the piece goods of the second partial conveyor flow.

13. The method according to claim 12, wherein the first partial conveyor flow runs in a lateral region of the conveyor flow.

14. The method according to claim 12, wherein the method steps b) and c) are carried out locally separated from each other by different line sections.

15. The method according to claim 12, wherein method step b) is carried out on a first section and method step c) is carried out on a second section different from the first section and adjoining the first section in the conveyor direction, wherein on the second section the first partial conveyor flow is not increased relative to the second partial conveyor flow.

16. The method according to claim 12, wherein method step b) is carried out on a first section comprising a first conveyor surface for receiving the first partial conveyor flow, and wherein the first conveyor surface of the first section has a substantially constant conveyor width.

17. The method according to claim 12, wherein the first partial conveyor flow is raised relative to the second partial conveyor flow in that piece goods of the first partial conveyor flow are conveyed in an ascending manner and piece goods of the second partial conveyor flow are conveyed in a horizontal and/or descending and/or less ascending manner than the first partial conveyor flow.

18. The method according claim 12, wherein the first partial conveyor flow is raised relative to the second partial conveyor flow in that piece goods of the second partial conveyor flow are conveyed in a descending manner and piece goods of the first partial conveyor flow are conveyed horizontally or to a lesser extent in a descending manner than the second partial conveyor flow.

19. The method according to claim 12, wherein the first partial conveyor flow is raised relative to the second partial conveyor flow by conveyor the first partial conveyor flow and the second partial conveyor flow on a spiral chute configured to raise the first partial conveyor flow relative to the second partial conveyor flow.

20. The method according to claim 12, wherein horizontal motion components of the first and the second partial conveyor flow run parallel to each other at least during the method step b).

21. The method according to claim 12, wherein the method is carried out on a conveyor line arrangement, comprising:

a first section and a second section adjoining the first section in a conveyor direction;

wherein the conveyor line arrangement is configured to convey the conveyor flow on the first section divided into at least a first partial conveyor flow and a second partial conveyor flow and to generate a difference in height between the first partial conveyor flow and the second partial conveyor flow such that the first partial conveyor flow is arranged higher than the second partial conveyor flow at the end of the first section;

wherein the second section is configured to take over piece goods from the first partial conveyor flow and the second partial conveyor flow of the first section, and the conveyor line arrangement is configured to feed the first partial conveyor flow to the second partial conveyor flow by transferring piece goods from the first partial conveyor flow to piece goods of the second partial conveyor flow on the second section;

wherein the first section and/or the second section comprises a passive partial conveyor section on which the first partial conveyor flow can be conveyed, the conveyor line arrangement configured to convey piece goods of the first partial conveyor flow via a positive and/or frictional locking with conveyed piece goods of the second partial conveyor flow;

wherein a first conveyor surface on which the first partial conveyor flow is conveyed is arranged at an angle in the transverse direction to the conveyor direction to a second conveyor surface on which the second partial conveyor flow is conveyed; and wherein the first section and/or the second section comprises an active and/or a gravity-based partial conveyor section on which the second partial conveyor flow can be conveyed.

* * * * *